US011994830B2

(12) United States Patent
Ehrsam et al.

(10) Patent No.: US 11,994,830 B2
(45) Date of Patent: May 28, 2024

(54) WATCH EQUIPPED WITH A ROTATING BEZEL WITH A BEZEL LOCKING SYSTEM PROVIDED WITH AN INTEGRATED HELIUM VALVE

(71) Applicant: TISSOT SA, Le Locle (CH)

(72) Inventors: Nicolas Ehrsam, Evilard (CH); Laurie Saunders, Riaz (CH)

(73) Assignee: TISSOT SA, Le Locle (CH)

( * ) Notice: Subject to any disclaimer, the term of this patent is extended or adjusted under 35 U.S.C. 154(b) by 498 days.

(21) Appl. No.: 17/054,658

(22) PCT Filed: Jun. 20, 2019

(86) PCT No.: PCT/EP2019/066357
§ 371 (c)(1),
(2) Date: Nov. 11, 2020

(87) PCT Pub. No.: WO2020/011512
PCT Pub. Date: Jan. 16, 2020

(65) Prior Publication Data

US 2021/0116868 A1 Apr. 22, 2021

(30) Foreign Application Priority Data

Jul. 9, 2018 (EP) .................................... 18182381

(51) Int. Cl.
*G04B 19/28* (2006.01)

(52) U.S. Cl.
CPC .................................. *G04B 19/286* (2013.01)

(58) Field of Classification Search
CPC ...... G04B 37/02; G04B 37/08; G04B 37/103; G04B 19/283; G04B 19/286
See application file for complete search history.

(56) References Cited

U.S. PATENT DOCUMENTS

RE34,847 E 2/1995 Muderlak et al.
8,333,503 B2 12/2012 Hiranuma et al.
(Continued)

FOREIGN PATENT DOCUMENTS

CH 701 719 A2 2/2011
CH 701 721 A2 2/2011
(Continued)

OTHER PUBLICATIONS

International Search Report dated Aug. 30, 2019 in PCT/PE2019/066357 filed Jun. 20, 2019, citing documents AA and AO-Ap, therein, 2 pages.
(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A watch whose watch case includes a case middle and a rotating bezel provided with a bezel locking system. The system includes a rotating crown secured to an arbor, the arbor being arranged inside a radial hole in the case middle. By rotating the crown, the user can screw or unscrew the arbor with respect to the hole. The arbor includes a frustoconical section which interacts with a pin mounted perpendicularly to the arbor and returned towards the arbor by a spring. Screwing the arbor into the hole will cause the frustoconical section to push the pin into a receiving space provided on the lower surface of the bezel, which locks the bezel. Unscrewing the arbor automatically releases the pin from the receiving space by the return force exerted by the spring. The crown can include a helium valve mechanism.

9 Claims, 3 Drawing Sheets

(56) References Cited

U.S. PATENT DOCUMENTS

| | | | | |
|---|---|---|---|---|
| 2008/0117723 | A1 | 5/2008 | Hiranuma et al. | |
| 2011/0051570 | A1* | 3/2011 | Hiranuma | G04B 37/106 368/291 |
| 2014/0177397 | A1* | 6/2014 | Rudaz | G04B 19/24 368/32 |
| 2015/0241846 | A1* | 8/2015 | Briswalter | G04B 37/103 368/319 |
| 2018/0039229 | A1* | 2/2018 | Waeckerlin | G04B 3/043 |

FOREIGN PATENT DOCUMENTS

| | | | |
|---|---|---|---|
| CN | 673 197 | G | 2/1990 |
| CN | 1075217 | A | 8/1993 |
| CN | 1226322 | A | 8/1999 |
| CN | 101187800 | A | 5/2008 |
| CN | 102004435 | A | 4/2011 |
| CN | 102004436 | A | 4/2011 |
| CN | 103576526 | A | 2/2014 |
| CN | 207133592 | U | 3/2018 |
| EP | 2 685 327 | A1 | 1/2014 |
| JP | 44-12091 | | 6/1969 |
| JP | 50-61882 | U | 6/1975 |
| JP | 59-149080 | U | 10/1984 |
| JP | 63-134991 | A | 6/1988 |
| JP | 8-15451 | A | 1/1996 |
| JP | 2008-128880 | A | 6/2008 |
| KR | 10-1999-0006819 | A | 1/1999 |
| KR | 10-1999-0006820 | A | 1/1999 |

OTHER PUBLICATIONS

Korean Office Action dated Apr. 26, 2022 in Korean Patent Application No. 10-2020-7031380 (with English translation), citing documents AO through AQ, 10 pages.

Combined Chinese Office Action and Search Report dated May 6, 2021 in Chinese Patent Application No. 201980033742.5 (with English translation), citing documents AN and AO and AQ—AU therein, 15 pages.

Notice of the Reason for Refusal dated Nov. 9, 2021 in Japanese Patent Application No. 2020-556248 (with English language translation), citing documents AO and AP therein, 7 pages.

Combined Chinese Office Action and Search Report dated Jan. 5, 2022 in Chinese Patent Application No. 201980033742.5, citing documents AA and AO through AQ therein, 14 pages.

* cited by examiner

WATCH EQUIPPED WITH A ROTATING BEZEL WITH A BEZEL LOCKING SYSTEM PROVIDED WITH AN INTEGRATED HELIUM VALVE

CROSS-REFERENCE TO RELATED APPLICATIONS

The present application is a national stage entry of International Application No. PCT/EP2019/066357, filed Jun. 20, 2019, which claims priority to European Patent Application No. 18182381.6, filed on Jul. 9, 2018, the entire content and disclosure of which are incorporated by reference herein.

FIELD OF THE INVENTION

The present invention relates to watches provided with a rotating bezel.

STATE OF THE ART

The rotating bezel of a watch, mainly used in sports watches, can mark a point in time which serves as a reference point for the duration of a sports activity or otherwise. For certain types of watch, such as diver's watches, it is important to be able to lock the bezel to avoid any untimely activation thereof and any loss of time marker related to the duration of the activity. Various locking systems have been developed, which are generally complex and expensive to manufacture, or which do not ensure secure locking of the bezel.

SUMMARY OF THE INVENTION

It is an object of the present invention to provide a system for locking a watch bezel, which is simple, and which ensures locking in all circumstances. A watch case provided with said system is described in the annexed claims.

The invention concerns a watch whose case includes a middle part and a rotating bezel provided with a bezel locking system. The system includes a rotating crown which is secured to an arbor, the latter being arranged inside a radial hole made in the case middle. By rotating the crown, the user can screw or unscrew the arbor relative to the hole. The arbor includes a frustoconical section which interacts with a pin mounted perpendicularly to the arbor and returned towards the arbor by a spring. Screwing the arbor into the hole will cause the frustoconical section to push the pin into a receiving space provided on the lower surface of the bezel, which will lock the bezel. Unscrewing the arbor automatically releases the pin from the receiving space owing to the return force exerted by the spring.

Other features and advantages of the present invention will appear in the following description of preferred embodiments, given by way of non-limiting example, with reference to the annexed drawings.

DETAILED DESCRIPTION OF EMBODIMENTS OF THE INVENTION

In the following text, the terms 'lower' and 'upper' describe the position of elements of a watch case when the latter is held horizontally, with the time indicating means facing upwards.

Figure 1:
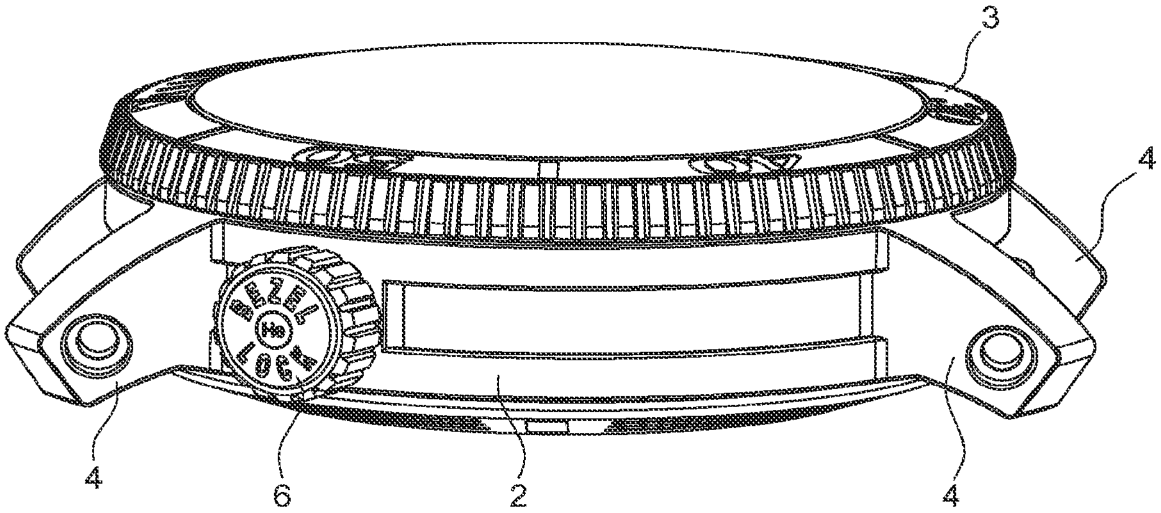
FIG. 1 represents a 3D image of the external structure of a watch case according to one embodiment of the invention.
Figure 2:
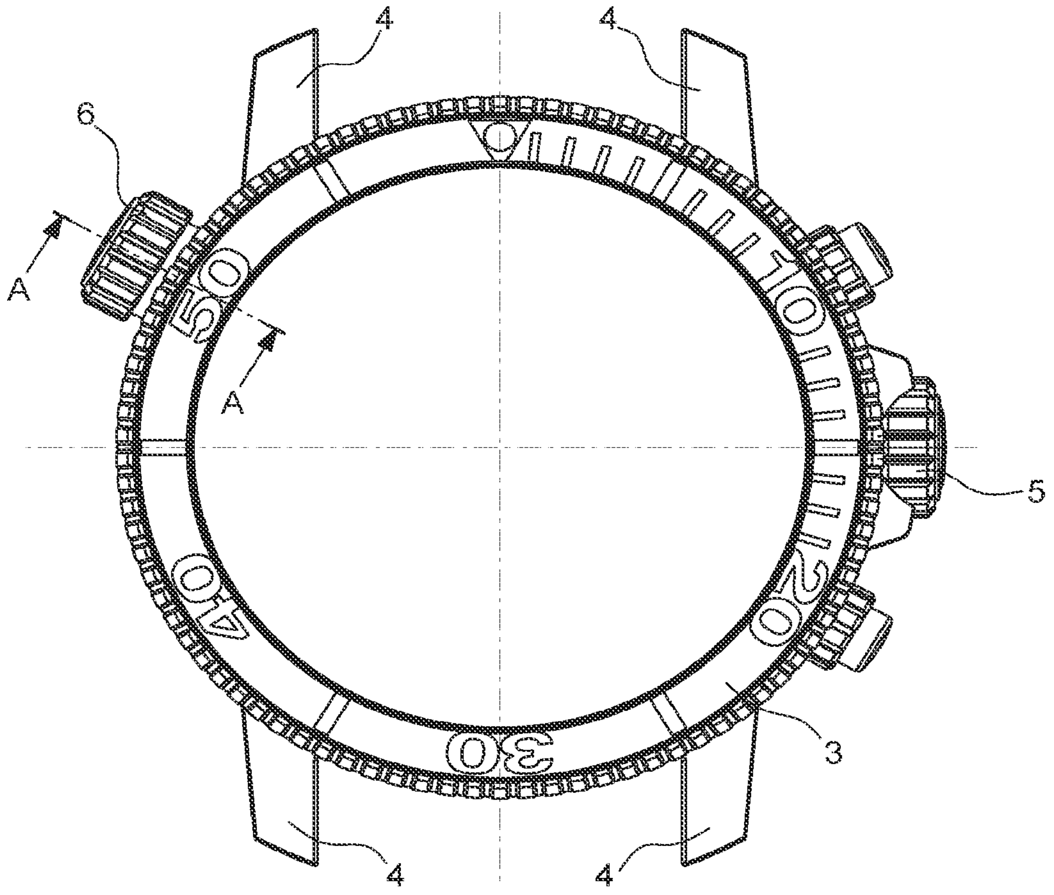
FIG. 2 represents a plan view of the structure of FIG. 1.

FIG. 1 represents a middle part 2 of a watch case according to one embodiment of the invention. A rotating bezel 3 is mounted on the upper surface of case middle 2. The internal components, such as a dial with hands, a numerical appliques and the internal mechanism, are not represented. These components do not form the subject of the invention and they can be made by known methods and using known technologies. Case middle 2 is provided with horns 4 for attaching the strands of a bracelet or strap. The plan view of FIG. 2 shows the conventional crown 5 for adjusting the watch hands. Case middle 2 is provided with an additional crown 6, which forms part of the system for locking rotating bezel 3 according to the invention.

Figure 3:
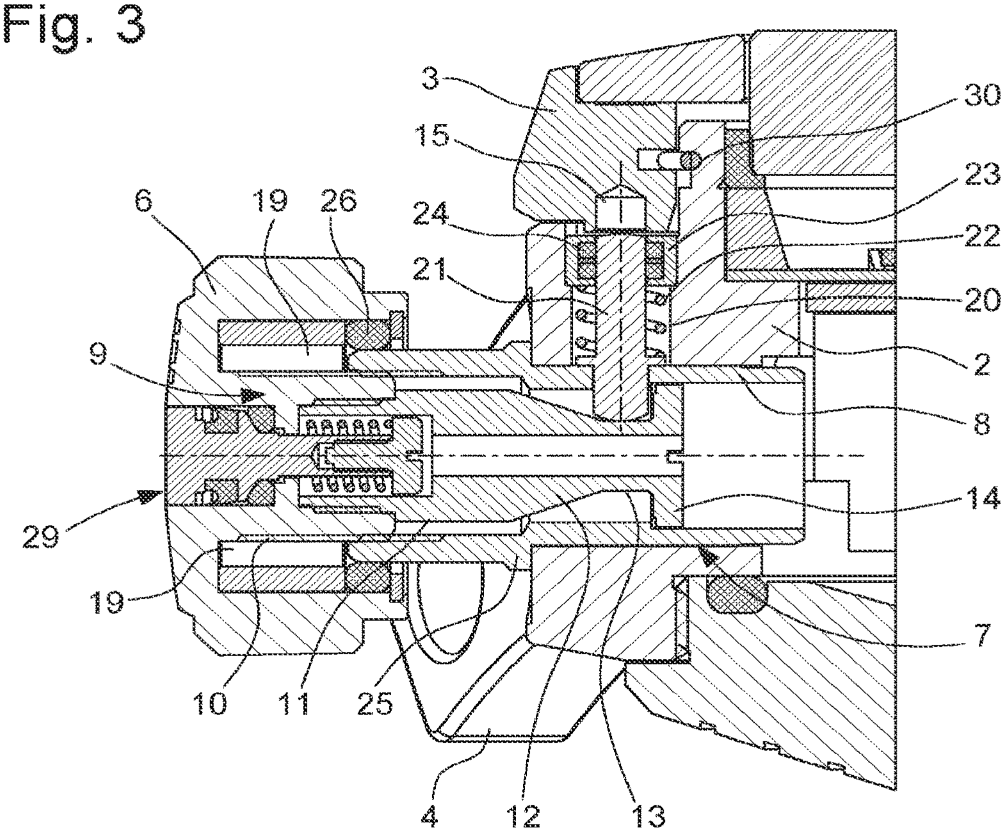
FIG. 3 represents a sectional view of the locking system according to the invention, in an unlocked position.

In FIG. 3, locking crown 6 is shown in a sectional view, in the unlocked position of the system. In a known manner, bezel 3 is rotationally restrained on case middle 2 by a polygonal spring 30 housed inside a pair of lateral slots respectively provided in the bezel and in the case middle. A first element of the locking system is formed by a radial hole 7 in case middle 2, inside which a tube 8 is fixedly mounted. Tube 8 may, for example, be pressed, bonded or screwed into case middle 2. One portion of tube 8 projects from the external side wall of case middle 2. Tube 8 is provided with an inner thread; the thread extends at least over the length of the portion that projects from case middle 2 and is intended to cooperate with a corresponding thread of locking crown 6.

Figure 4:
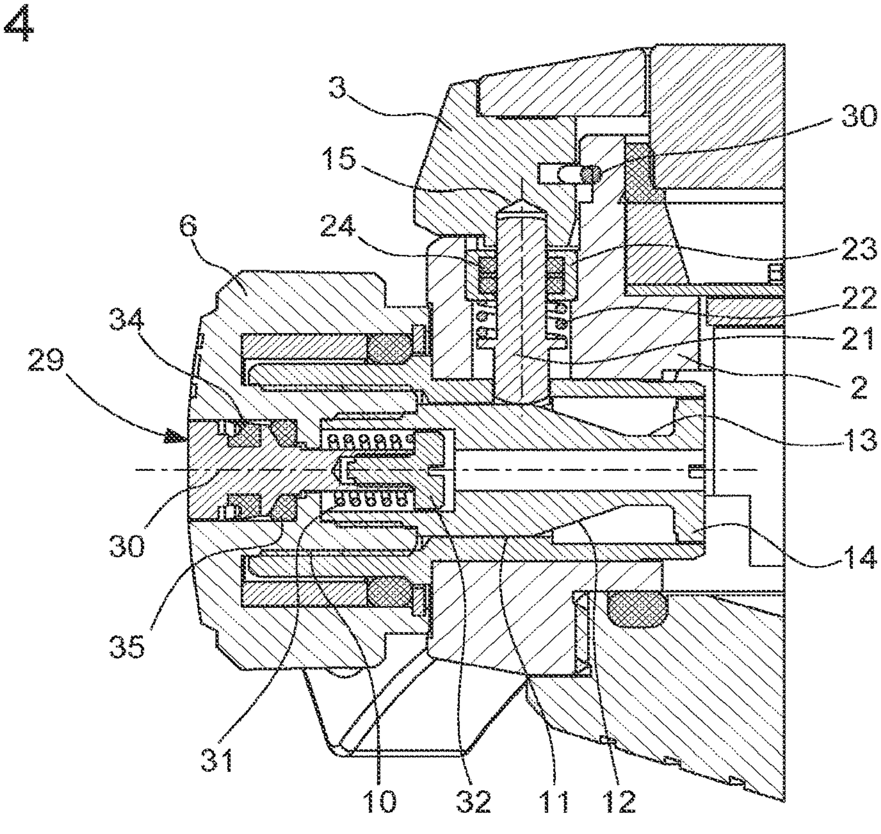
FIG. 4 represents a sectional view of the locking system according to the invention, in a locked position.
Figure 5:
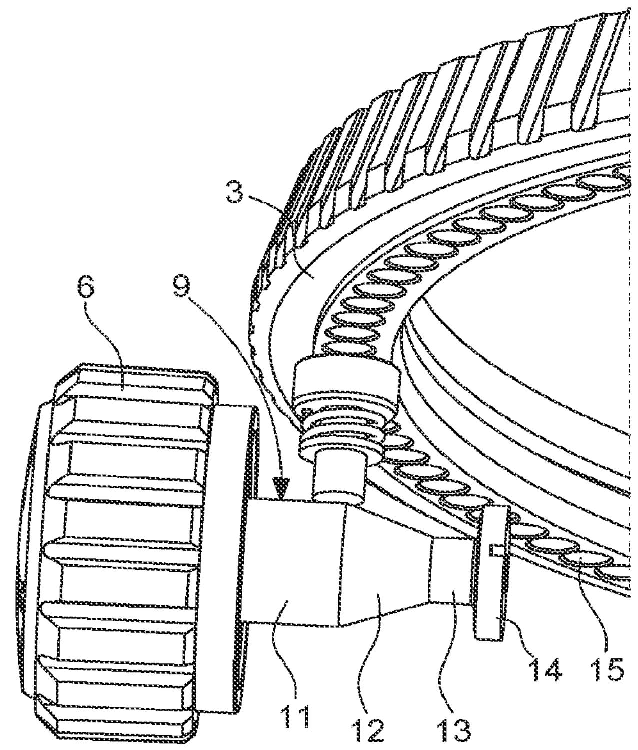
FIG. 5 represents a 3D view of the locking system cooperating with the watch bezel.

Locking crown 6 is secured to an arbor 9, the various parts of which are shown in FIGS. 3 and 4, and in FIG. 5, which represents a 3D view of the arbor. From the exterior of case middle 2 inwards, arbor 9 has a threaded section 10, the outer thread of said section corresponding to the inner thread provided inside tube 8. Threaded section 10 lies inside crown 6, on the inner surface of a circular groove 19 which extends into the body of crown 6. Threaded section 10 is followed by a first cylindrical section 11 (non-threaded), a frustoconical section 12 and a second cylindrical section 13 which ends in a collar 14. Frustoconical section 12 continuously decreases the diameter of the arbor between the diameters of the first and second cylindrical sections 11 and 13. The diameter of collar 14 corresponds to the internal diameter of tube 8, such that collar 14 can slide with respect to tube 8.

FIG. 5 shows that the lower face of bezel 3 has a plurality of axial holes 15 regularly distributed over the edge of the bezel.

Further, as shown in FIGS. 3 and 4, case middle 2 is provided with a hole 20 which is oriented perpendicularly to arbor 9, and inside which a pin 21 is mounted, such that said pin 21 slides with respect to hole 20 and interacts with arbor 9. Preferably the central axes of pin 21 and locking arbor 9 are perpendicular to one another and intersect at one point. Pin 21 is returned towards arbor 9 by a spring 22, in order to maintain physical contact between the inner end of pin 21 and the surface of arbor 9. When crown 6 is completely unscrewed (FIG. 3), pin 21 is in contact with the section of minimum diameter 13 and with collar 14. In this position, the upper end of pin 21 is not housed inside any of axial holes 15 of bezel 3. Bezel 3 is thus free and can be rotated by the user.

By rotating crown 6, the user can then cause arbor 9 to enter tube 8 by screwing threaded section 10 into the tube. The movement of arbor 9 will gradually push pin 21 into one of axial holes 15 of the bezel, through the interaction between pin 21 and the slope of frustoconical section 12, against the prestressing force exerted by spring 22. In the locking position shown in FIG. 4, the lower end of pin 21 is in contact with first cylindrical section 11 and the upper end of pin 21 is housed inside hole 15, thereby securely locking the bezel which cannot be accidentally released. In this locking position, the portion of the tube that projects from the case middle wall has entered circular groove 19.

To unlock the system, the user unscrews crown 6 towards the configuration of FIG. 3. Spring 22 causes pin 21 to descend until the pin has completely exited hole 15, resulting in the release of the bezel. Preferably, pin 21 is slidably arranged in a block 23 mounted inside hole 20 and including sealing gaskets 24.

The friction between the threads on arbor 9 and on tube 8 ensures secure locking of the system, which can only be released by the user deliberately unscrewing crown 6. Further, as illustrated in the Figures, tube 8 can comprise a portion 25 having a larger diameter than that of the rest of the tube, said portion 25 being mounted to abut against the outer side wall of case middle 2. Crown 6 is provided with a sealing gasket 26 between the crown body and the external surface of tube 8. Gasket 26 will be pushed against the portion of larger diameter 25 when crown 6 reaches its locking position. Gasket 26 will not only have a sealing effect but will also ensure fixed closure owing to the compression between crown 6 and the portion of larger diameter 25.

According to the embodiment represented in the Figures, a helium valve 29 is integrated in the crown and, more precisely, inside arbor 9. The valve is arranged coaxially to arbor 9. It has a body 30 prestressed by a spring 31. Body 30 includes, at its inner end, a surface 32, which is subjected to the pressure inside case middle 2. Above a predefined threshold, the pressure will overcome the prestressing force exerted by spring 31, resulting in depressurization of the interior of case middle 2. One or more sealing gaskets 34 and 35 are mounted between the body of valve 30 and in the inner surface of arbor 9. The inclusion of valves in diver's watches is already known and the invention is not limited to the embodiment represented in the Figures, but also includes embodiments that do not have a valve inside arbor 9, or which have a valve mounted elsewhere in case middle 2. The function of the valve is to release gases that have infiltrated the watch during a saturation dive. During ascent, the pressure created by these gases, generally helium, can damage the watch.

Variants of the embodiment represented in the Figures can be envisaged by those skilled in the art, without departing from the scope of the invention as defined by the claims. For example, the combination of groove 19, between the body of crown 6 and arbor 9, and the portion of tube 8 that projects from case middle 2 results in a robust structure having good sealing properties. Nonetheless, other forms of crowns secured to an arbor are possible. For example, it is possible to envisage a crown made without groove 19, but with a thread provided on first cylindrical section 11. Further, said first and second cylindrical sections are not essential: the end positions of pin 21 with respect to frustoconical section 12 may be situated on said frustoconical section 12 itself. Arbor 9 may be directly arranged in a threaded hole in case middle 2 rather than in a tube 8 mounted inside the case middle. Further, holes 15 are simply examples of receiving spaces capable of receiving the end of pin 21. In another embodiment, bezel 3 could include an axial toothing on its lower surface, with the recesses between two teeth forming a receiving space for pin 21. In such case, the end of pin 21 is preferably machined so that the shape of said end corresponds to the shape of the recesses.

The invention claimed is:

1. A watch case comprising:

a case middle;

a rotating bezel mounted on an upper face of the case middle, the bezel being provided with a plurality of receiving spaces regularly distributed over a lower surface; and a system for locking the bezel comprising:

a first hole machined in the case middle and oriented radially with respect to the bezel, an inner thread on at least one portion of a surface of said first hole, or on an inner surface of a tube fixedly mounted inside the first hole, a rotating crown, the crown being secured to an arbor arranged inside the first hole, the arbor including the following elements arranged in an inward direction from an exterior of the case middle:

a section provided with an external thread in direct contact with said inner thread, a frustoconical section having a diameter that decreases in said inward direction, and an end collar, and a pin arranged inside a second hole in the case middle, said second hole being oriented transversely with respect to the first hole, the pin being provided with a spring that is prestressed in order to maintain physical contact between a first end of the pin and an external surface of the arbor, the pin being dimensioned such that its second end can be housed inside one of the receiving spaces of the bezel, wherein the elements are arranged such that:

screwing in the crown towards the interior of the case middle causes a movement of the pin against the prestressing of the spring, through an interaction between the first end of the pin and the frustoconical section, the movement pushing the pin inside one of the receiving spaces of the bezel, and thereby locking the bezel at an end of the screwing, and unscrewing the crown releases the pin from said receiving space under the action of the return force exerted by the spring, and thereby unlocks the bezel at an end of the unscrewing, wherein the arbor also includes a first cylindrical section and a second cylindrical section located on either side of the frustoconical section such that the diameter of the frustoconical section gradually changes from a diameter of the first cylindrical section to a diameter of the second cylindrical section, and wherein the second cylindrical section extends continuously from the frustoconical section to the end collar, the end collar extending radially outward from an end of the second cylindrical section such that a side of the pin contacts the second cylindrical section and a side face of the end collar at the end of the unscrewing, the contact between the pin and the end collar preventing the crown from being unscrewed any further.

2. The case according to claim 1, wherein a tube is fixedly mounted inside the first hole, said tube including a portion that projects from an external side wall of the case middle and wherein at least the internal surface of the portion of tube projecting from said wall is provided with said internal thread.

3. The case according to claim 2, wherein a circular groove is present between a body of the crown and the threaded section of the arbor such that the portion projecting from the tube enters said groove when the crown is screwed into a locking position.

4. The case according to claim 3, wherein the tube is provided with a portion having a larger diameter than a diameter of the rest of the tube, said portion being mounted to abut against the external side wall of the case middle, and wherein a sealing gasket is mounted between the body of the crown and an exterior of the portion of the tube projecting from said wall such that the gasket is pushed against the portion of larger diameter when the crown and the arbor reach the locking position.

5. The case according to claim 1, further comprising a depressurization valve arranged inside the arbor.

6. The case according to claim 1, wherein a diameter of the end collar corresponds to a diameter of the first hole or of a tube fixedly mounted inside said first hole such that the collar can slide inside the first hole or inside the tube.

7. A watch comprising:

a watch case including a case middle;

a rotating bezel mounted on an upper face of the case middle, the bezel being provided with a plurality of receiving spaces regularly distributed over a lower surface; and a system for locking the bezel comprising:

a first hole machined in the case middle and oriented radially with respect to the bezel, an inner thread on at least one portion of a surface of said first hole, or on an inner surface of a tube fixedly mounted inside the first hole, a rotating crown, the crown being secured to an arbor arranged inside the first hole, the arbor including the following elements arranged in an inward direction from an exterior of the case middle:

a section provided with an external thread in direct contact with said inner thread, a frustoconical section having a diameter that decreases in said inward direction, and an end collar having a outer face in contact with the inner surface of the tube, and a pin arranged inside a second hole in the case middle, said second hole being oriented transversely with respect to the first hole, the pin being provided with a spring that is prestressed in order to maintain physical contact between a first end of the pin and an external surface of the arbor, the pin being dimensioned such that its second end can be housed inside one of the receiving spaces of the bezel, wherein the elements are arranged such that:

screwing in the crown towards the interior of the case middle causes a movement of the pin against the prestressing of the spring, through an interaction between the first end of the pin and the frustoconical section, the movement pushing the pin inside one of the receiving spaces of the bezel, and thereby locking the bezel at an end of the screwing, and unscrewing the crown releases the pin from said receiving space under the action of the return force exerted by the spring, and thereby unlocks the bezel at an end of the unscrewing, wherein the arbor also includes a first cylindrical section and a second cylindrical section located on either side of the frustoconical section such that the diameter of the frustoconical section gradually changes from a diameter of the first cylindrical section to a diameter of the second cylindrical section, and wherein the second cylindrical section extends continuously from the frustoconical section to the end collar, the end collar extending radially outward from an end of the second cylindrical section such that a side of the pin contacts the second cylindrical section and a side face of the end collar at the end of the unscrewing, the contact between the pin and the end collar preventing the crown from being unscrewed any further.

8. The watch according to claim 7, wherein the second cylindrical section has a length in an axial direction of the arbor that is longer than a length of the end collar.

9. The case according to claim 1, wherein the second cylindrical section has a length in an axial direction of the arbor that is longer than a length of the end collar.

* * * * *